United States Patent [19]

Jones

[11] Patent Number: 5,005,789

[45] Date of Patent: Apr. 9, 1991

[54] PIPE HANGER

[76] Inventor: Harold D. Jones, 6392 Van Vleet Rd., Swartz Creek, Mich. 48473

[21] Appl. No.: 392,014

[22] Filed: Aug. 10, 1989

[51] Int. Cl.$^5$ .............................................. F16B 15/00
[52] U.S. Cl. .................................... 248/58; 248/71
[58] Field of Search ................ 248/58, 55, 220.4, 62, 248/71, 65

[56] References Cited

U.S. PATENT DOCUMENTS

| 501,439 | 7/1893 | Reznor . | |
|---|---|---|---|
| 1,529,881 | 3/1925 | Engle . | |
| 2,291,148 | 7/1942 | Carson | 248/58 |
| 2,319,832 | 5/1943 | Trochim . | |
| 2,352,145 | 6/1944 | Wright | 248/58 |
| 2,641,428 | 6/1953 | Kirk et al. | 248/58 X |
| 2,752,017 | 6/1956 | Segil . | |
| 2,835,478 | 5/1958 | Bemish | 248/55 X |
| 3,266,761 | 8/1966 | Walton et al. . | |
| 3,687,406 | 8/1972 | Krahe et al. | 248/55 |
| 4,057,210 | 11/1977 | Wellman . | |
| 4,266,745 | 5/1981 | Jones | 248/58 |
| 4,783,033 | 11/1988 | Valiulis | 248/220.4 |
| 4,941,630 | 7/1990 | Albano | 248/71 |

*Primary Examiner*—David L. Talbott
*Attorney, Agent, or Firm*—Gifford, Groh, Sprinkle, Patmore and Anderson

[57] ABSTRACT

A pipe hanger for relatively large diameter plastic pipes is disclosed. The pipe hanger includes an elongated wire having two free ends and U-shaped midportion. The free ends of the wire are pointed so that they can be driven into a structural element, such as a joist. An elongated flexible and resilient strap is attached to the U-shaped midportion of the wire to support the pipe. A plurality of locking tabs protrude outwardly from one side of the strap and are dimensioned to resiliently, lockingly attach the strap to the wire.

2 Claims, 1 Drawing Sheet

PIPE HANGER

BACKGROUND OF THE INVENTION

I. Field of the Invention

The present invention relates to pipe hangers.

II. Description of the Prior Art

Pipe hangers have long been used to support pipes in buildings by attaching the pipe to a structural element of the building, such as a building joist. In its simplest form, the pipe hanger consists of a wire which is looped under the pipe and then attached to the joist.

These simple pipe hangers, however, cannot be used for relatively large plastic pipes, e.g. pipes greater than two inches in diameter, since the wire galls the pipe. For such large pipes, a strap must be used to prevent galling and such straps are oftentimes required by building codes.

There have been prior art pipe hangers in which a strap is mounted to the wire. One such pipe hanger is shown in my prior U.S. Pat. No. 4,266,745 which issued on May 12, 1981. While my prior pipe hanger has proven effective in use, it is relatively difficult and time consuming to assemble the strap to the wire.

SUMMARY OF THE PRESENT INVENTION

The present invention provides a pipe hanger for large diameter pipes which overcomes the above mentioned disadvantages of the prior art devices.

In brief, the pipe hanger of the present invention comprises an elongated wire having two free ends and a U-shaped midportion. The U-shaped midportion is dimensioned to extend under and support the pipe. Conversely, the free ends of the wire are pointed and are adapted to be driven into a structural element, such as a joist.

The pipe hanger also includes an elongated, flexible strap which is attached to the U-shaped midportion of the wire to support the pipe. Preferably, the strap is constructed of plastic or a similar material.

In order to attach the strap to the wire, the strap includes at least two locking tabs which protrude outwardly from one side of the strap. The locking tabs are spaced apart from each other by a distance slightly less than the diameter of the wire so that, when the wire is pushed between the locking tabs, the locking tabs resiliently, lockingly attach the strap to the pipe. Although only two locking tabs are necessary to attach the strap to the wire, preferably a plurality of pairs of locking tabs are provided at spaced intervals along the length of the strap.

Since the strap is attached to the wire by simply pushing the strap onto the wire, the pipe hanger can be easily and rapidly assembled.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
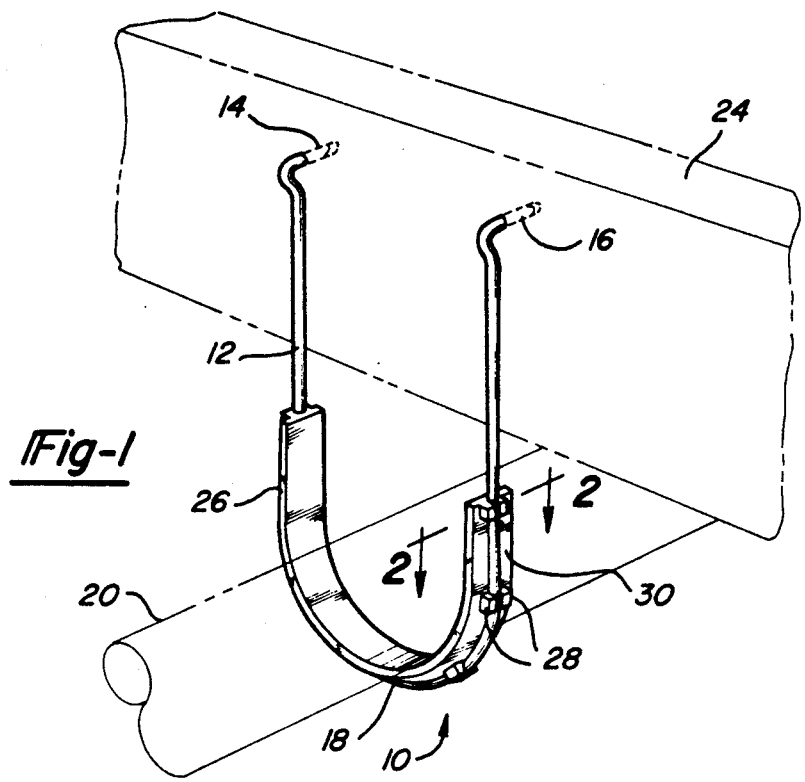
FIG. 1 is a perspective view of a preferred embodiment of the present invention.
Figure 3:
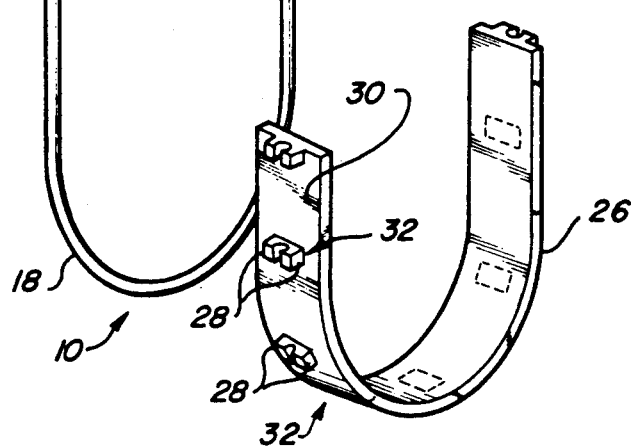
FIG. 3 is an exploded side view of the preferred embodiment of the present invention.

With reference first to FIGS. 1 and 3, a preferred embodiment of the pipe hanger 10 of the present invention is thereshown and comprises an elongated wire 12 having two free ends 14 and 16 and a U-shaped midportion 18. The U-shaped midportion 18 is dimensioned to extend under and support a pipe 20 as will be subsequently described in greater detail.

Each free end 14 and 16 of the wire 12 includes a point 22 which extends generally perpendicular to a plane of the U-shaped midportion 18. The points 22 are adapted to be driven into a structural element 24, such as a joist, to secure the pipe hanger 10 to the structural element 24.

Still referring to FIGS. 1 and 3, the pipe hanger 10 further comprises an elongated strap 26 which is secured to the U-shaped midportion 18 of the wire 12. The strap 26 is constructed of a flexible and resilient material, such as plastic or other synthetic material.

Figure 2:
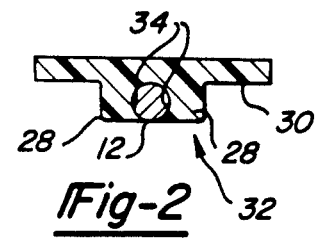
FIG. 2 is a sectional view taken along line 2—2 in FIG. 1 and enlarged for clarity.

Referring now to FIGS. 1–3, in order to secure the strap 26 to the wire 12, a plurality of locking tabs 28 protrude outwardly from one side 30 of the strap 26. The locking tabs 28 are arranged in pairs 32 (FIG. 3) which are longitudinally spaced along the strap 26. Each pair 32 of locking tabs 28 are substantially identical so that only one pair 32 will be discussed in detail, it being understood that a like description shall also apply to the other pairs 32.

As best shown in FIG. 2, each pair 32 of locking tabs 28 has facing surfaces 34 which are spaced apart from each other by a distance slightly less than the diameter of the wire 12. In addition, each surface 34 is preferably s semi-circular in shape so that it flatly abuts against the circular wire 12.

In order to attach the strap 26 to the wire 12, the wire 12 is pushed between the locking tabs 28. In doing so, the locking tabs 28 flex outwardly until the wire 12 is positioned between the semi-circular surfaces 34 of the locking tabs 28. The locking tabs 28 then flex towards each other and resiliently, lockingly entrap the wire 12 between them.

Since the strap 26 can be attached to the wire 12 by simply pushing the strap 26 onto the wire 12 until it "snaps" in place, the pipe hanger 10 of the present invention can be rapidly and easily assembled.

Having described my invention, many modifications thereto will become apparent to those skilled in the art to which it pertains without deviation from the spirit of the invention as defined by the scope of the appended claims.

I claim:

1. A pipe hanger for supporting a pipe on a structural element comprising:
    an elongated wire having two free ends and a U-shaped midportion,
    means for attaching said free ends of the wire to the structural element,
    an elongated flexible strap of uniform thickness through its length, said strap being constructed of a plastic material,
    means for attaching said strap to said U-shaped midportion of said wire, said attaching means comprising at least two pairs of spaced apart locking tabs, said locking tabs protruding outwardly from one side of said strap and being dimensioned to resiliently lockingly receive the wire therebetween, said locking tabs further integrated with said flexible strap as a one piece construction.

2. The invention as defined in claim 1 wherein each locking tab has a surface which faces the other locking tab, said locking tab surface including a semi-circular portion dimensioned to flatly abut against said wire.

* * * * *